United States Patent [19]

Watanabe et al.

[11] Patent Number: 4,651,172

[45] Date of Patent: Mar. 17, 1987

[54] INFORMATION RECORDING MEDIUM

[75] Inventors: Ryuji Watanabe, Ibaraki; Tetsuro Minemura, Hitachi; Tetsuo Ito, Mito; Hisashi Ando, Hitachi; Yoshihito Maeda, Mito; Masaichi Nagai, Hitachi; Seiki Shimizu, Hitachi; Kiyoshi Konno, Hitachi; Toshiki Kaneko, Hitachi, all of Japan

[73] Assignee: Hitachi, Ltd., Tokyo, Japan

[21] Appl. No.: 801,950

[22] Filed: Nov. 26, 1985

[30] Foreign Application Priority Data

| Nov. 29, 1984 | [JP] | Japan | 59-252705 |
| Nov. 29, 1984 | [JP] | Japan | 59-252706 |
| Nov. 30, 1984 | [JP] | Japan | 59-251889 |
| Dec. 3, 1984 | [JP] | Japan | 59-255301 |
| Dec. 3, 1984 | [JP] | Japan | 59-255328 |

[51] Int. Cl.$^4$ .................. G01D 15/34; B05D 1/36; G03C 1/00
[52] U.S. Cl. .................. 346/135.1; 427/162; 427/402; 427/404; 428/694; 428/913; 430/495; 430/945
[58] Field of Search .................. 346/135.1; 427/162, 427/402, 404; 428/694, 913; 430/495, 945

[56] References Cited

U.S. PATENT DOCUMENTS

| 4,415,650 | 11/1983 | Kido et al. | 430/273 X |
| 4,461,807 | 7/1984 | Mori et al. | 428/469 X |
| 4,465,767 | 8/1984 | Oba et al. | 430/271 X |

Primary Examiner—E. A. Goldberg
Assistant Examiner—Gerald E. Preston
Attorney, Agent, or Firm—Antonelli, Terry & Wands

[57] ABSTRACT

In an information recording medium having a recording layer for recording information by heating through incoming energy, at least one of an interference layer and an absorption layer for the incoming energy is provided on the energy-incoming side of the recording layer to reduce the reflected energy from the information recording medium and increase the quantity of heat input into the recording layer. The temperature of the recording layer is rapidly enhanced, and rapid writing is made possible thereby. Writing or erasing can be made with less incoming energy, and thus the writing sensitivity or erasing sensitivity of the information recording medium can be increased.

18 Claims, 16 Drawing Figures

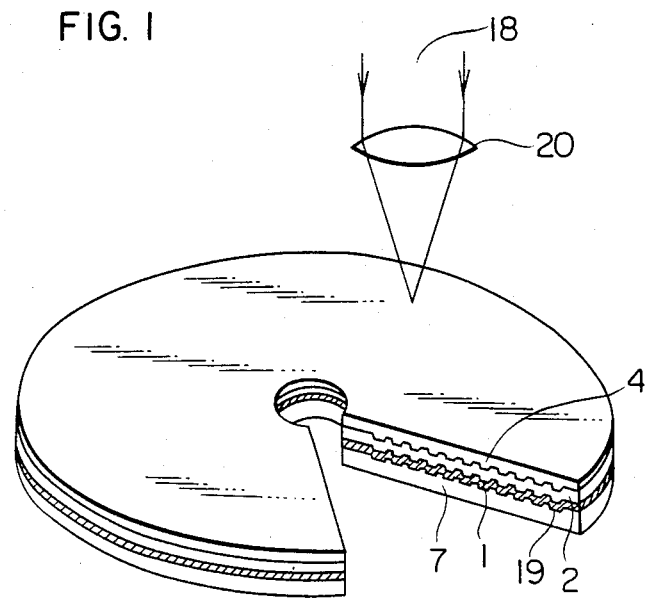
FIG. 1
FIG. 2(a)
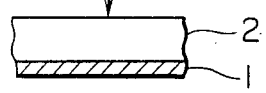
FIG. 2(b)
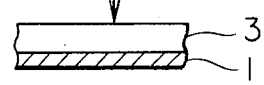
FIG. 2(c)
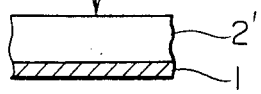
FIG. 2(d)
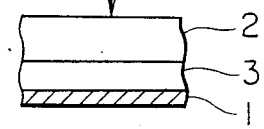
FIG. 2(e)
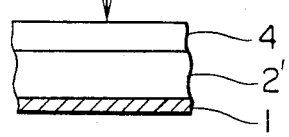
FIG. 2(f)
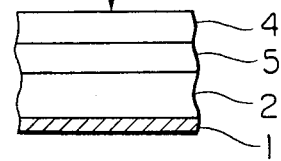

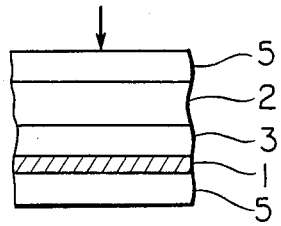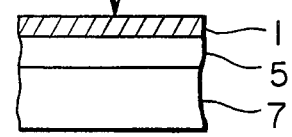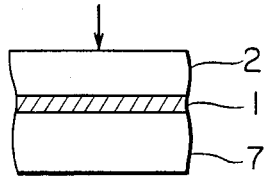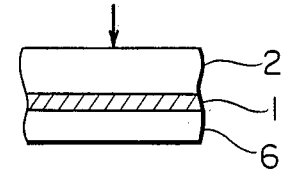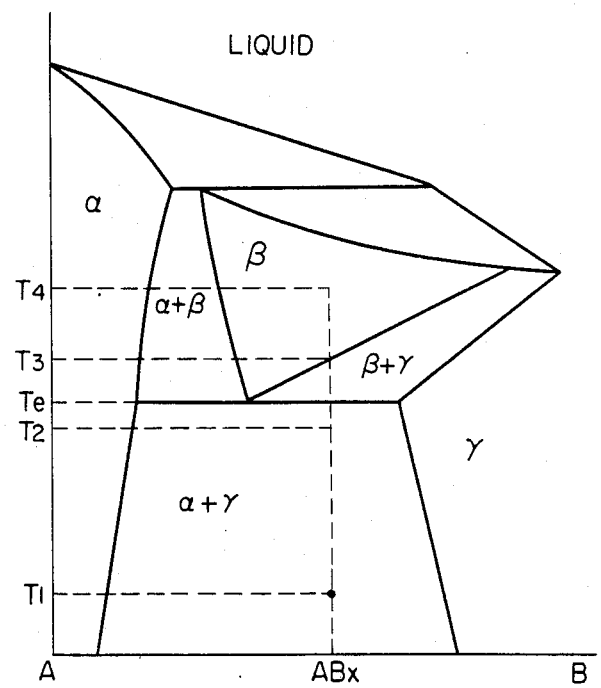

FIG. 7
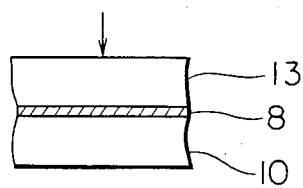
FIG. 8(a)
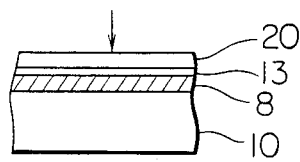
FIG. 8(b)
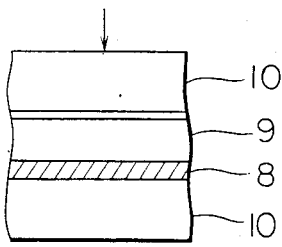
FIG. 9(a)
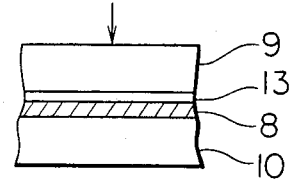
FIG. 9(b)
FIG. 10
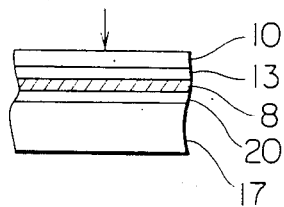

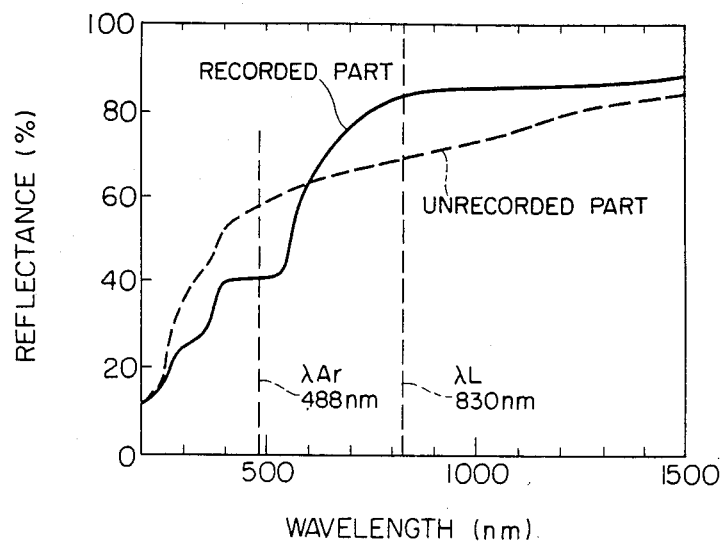
FIG. II(a)
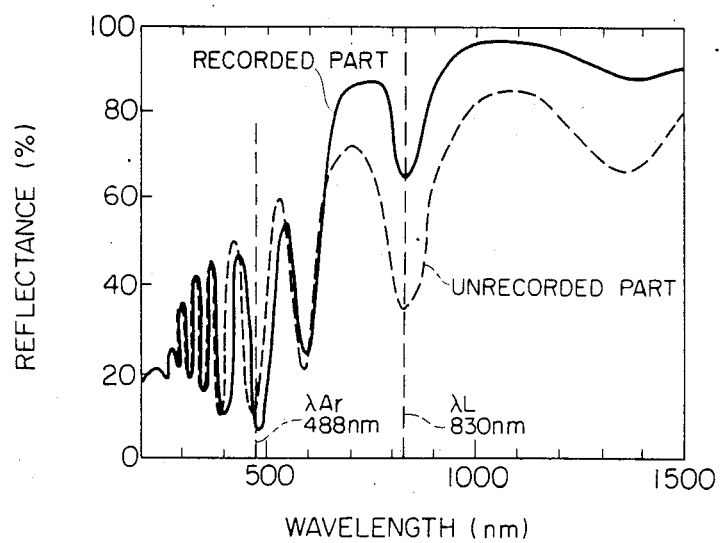
FIG. II(b)

INFORMATION RECORDING MEDIUM

BACKGROUND OF THE INVENTION

This invention relates to a novel recording medium for an information recording-reproducing apparatus and more particularly to a disk for use in an information recording-reproducing apparatus, which utilizes a change in the crystal structure of an alloy, caused under light and heat energy, and the resulting change in the spectral reflectance.

DESCRIPTION OF THE PRIOR ART

With recent trends for higher density and digitalization of information recording, various information recording-reproducing systems have been under development. Particularly, an optical disk utilizing the photo energy of a laser in recording, erasing and reproduction of information can perform recording at a high recording density than that of a magnetic disk, and will be a most promising system for information recording, where a reproduction apparatus by a laser is now practically used as a compact disk (CD).

On the other hand, recording systems can be classified into two major types, i.e. DRAW (direct-read after write) type and R/WM (read write memory) type or EDRAW (erasable DRAW) type, where the former can perform only one writing but fails to perform erasing, whereas the latter is a system capable of performing repeated recording and erasing. The DRAW type recording utilizes breakage or shaping of a medium in the recording segment by a laser beam, thereby forming a surface irregularity, and its reproduction utilizes a change in the light reflection at the irregular surface by interference of laser beam. In the DRAW type recording medium, tellurium (Te) or its alloys are usually used, and it is generally known to form surface irregularity by melting and sublimation of an alloy caused by the incoming laser beam. However, such media have some problem of toxicity, etc. The R/WM type recording medium mainly utilizes photo-magnetic materials, where it is known that R/WM type recording utilizes a magnetic anisotropy of the recording medium around the Curie temperature by virtue of a photo energy and the reproduction utilizes a difference in the polarizing angle in that segment by the magnetic Farady effect and magnetic Kerr effect of incoming polarized beam. This R/WM type recording medium is most promising, and its extensive research and development are now in progress with the aim to practical utilization within a few years. However, up to now, no materials having a large difference in the polarizing angle have been available yet, and there are serious problems such as low output levels in S/N, C/N, etc. in spite of many attempts such as formation of multi-layer film, etc.

Other R/WM type recording media utilizing a reversible phase change are also known, one of which performs recording by utilizing a change in the reflectance, caused by a reversible phase change between the amorphous phase and the crystalline phase. An example of such materials is a tellurium oxide (TeOx) alloy containing a small amount of germanium (Ge) and tin (Sn). However, in this recording system, the crystallization temperature of the amorphous phase is low, and a good phase stability cannot be obtained at room temperature, deteriorating the reliability of disks.

On the other hand, it is also known as another example of utilizing the reversible phase change to perform recording on the basis of changes in color tone caused by a phase change between the crystalline phases. An example of such materials is an alloy disclosed in Japanese Patent Application Kokai (Laid-open) No. 57-140845. The alloy consists of 12 to 15% by weight of Al and 1 to 5% by weight of Ni, the balance being Cu, and reversibly changes from red to gold and vice versa at the martensite transformation temperature as a boundary. The martensite transformation is a transformation naturally occuring with decreasing temperature, and the color tone obtained in a state kept above the martensite transformation temperature cannot be maintained at a temperature below the martensite transformation temperature. On the contrary, when the color tone obtained below the martensite transformation temperature is brought to a temperature above the martensite transformation temperature, the color tone changes into other color tone through the transformation. It is possible to perform recording by locally causing such a change in color tone on the recording medium.

SUMMARY OF THE INVENTION

An object of the present invention is to provide an information recording medium with a recording layer having a high energy input efficiency.

According to the present invention, an information recording medium with a recording layer that records information by heating caused by incoming light energy is provided, where at least one of an interference layer and an absorption layer for an incoming light energy is provided at the light energy-incoming side of the recording layer.

The present recording medium is applicable to both DRAW type and R/WR type optical disks.

If a reflecting energy from an information recording medium can be reduced by any means, the heat quantity input into the recording layer is increased, and the temperature of the recording layer is rapidly enhanced, making it possible to perform high speed writing and also perform writing or erasing with less incoming energy. That is, the writing sensitivity or erasing sensitivity of an information recording-reproducing medium can be increased.

Absorption layer

When an absorption layer 3 comprising a substance capable of absorbing an incoming energy is provided at the incoming energy side of a recording layer 1, as shown in FIG. 2(b), most of the incoming energy is absorbed by the absorption layer 3 and changed into a thermal energy, whereby the temperature of the absorption layer 3 is rapidly increased. As a result, most of the thermal energy is transferred from the absorption layer 3 to the recording layer 1, and the temperature of the recording layer 1 is also rapidly elevated to a higher one, as compared with the temperature attained when there is no absorption layer 3. It is desirable that the absorption layer 3 has such a thickness that the surface reflectance (percentage of reflected energy to incoming energy) of an information recording-reproducing medium can be 5% to 80%. When the reflectance is less than 5%, the intensity of the reflected light becomes lower, and the signal/noise ratio (S/N ratio) during the reproduction of recorded signal by reading the recorded signals through comparison of the intensity of reflected light at the recorded parts with that at the unrecorded parts is deteriorated. When the reflectance exceeds 80% on the other hand, most of the incoming energy is reflected at the absorption layer 3 without changing into the thermal energy, and thus the temperature of the absorption layer 3 is not increased. As a result, there is no substantial transfer of thermal energy to the recording layer 1, and any increase in the writing sensitivity or erasing sensitivity of an information recording-reproducing medium cannot be expected. The material for the absorption layer can be selected from titanium oxide, chromium oxide, copper oxide, tricopper tetroxide, carbon black, dyes, etc.

Interference layer

The temperature of a recording layer can be elevated by providing an interference layer in place of the absorption layer, thereby reducing the surface reflectance. It is preferable to use an interference layer of tantalum oxide, alumina, etc. having an energy transmission of at least 50%. It is preferable that the interference layer has a thickness of 50 to 500 nm and is colorless. By providing a transparent, colorless interference layer 2 having an appropriate thickness at the energy-incoming side of a recording layer 1, as shown in FIG. 2(a), some of the incoming energy is reflected at the surface of the interference layer, whereas the remaining incoming energy goes into the interference layer 2 and reaches the recording layer 1. Some of the incoming energy that has reached the recording layer 1 is reflected at the surface of the recording layer 1, and passes through the interference layer 2 in the reversed direction and reaches the surface of the interference layer 2. When the incoming energy has wave characteristics as electromagnetic wave, then the wave of reflected energy at the surface of the interference layer 2 and the wave of the energy reflected back from the surface of the recording layer 1 interfere with each other. The phases of these two energy waves differ from each other only by one half of the energy wave, the peak and the bottom of the energy waves are offset each other, reducing the amplitude of the energy waves. This means that the energy reflected back from the surface of an information recording-reproducing medium is substantially reduced. That is, the energy reflectance can be reduced by making the interference layer 2 have an appropriate thickness. In that case, the light absorption through the interference layer 2 is very small, and thus the remaining energy resulting from the subtraction of the reflected energy from the incoming energy is all absorbed by the recording layer 1. That is, the temperature of the recording layer 1 is rapidly elevated to a higher one, as compared with the temperature obtained where there is no interference layer 2.

Most suitable thickness of the interference layer can be determined according to the following equation derived from the theory of interference:

$$d = \frac{\lambda}{2n_1} (2m + 1) \tag{1}$$

(m = 0, 1, 2, 3 . . .)
d: Thickness of an interference layer
$n_1$: Refractive index of an interference layer
$\lambda$: Wavelength of energy wave Most suitable refractive index $n_1'$ of an interference layer can be given by the following equation likewise derived from the theory of interference:

$$n_1' = \sqrt{n_2} \tag{2}$$

$n_2$: refractive index of a recording layer 1

In the foregoing description, a layer having a single function has been described as an incoming energy absorption layer or as an interference layer, but it is possible to provide a single layer having a function of an interference layer and a function of an absorption layer at the same time.

To provide both functions of an interference layer and an interference layer, it is preferable to use a film of titanium oxide, chromium oxide, copper oxide or triiron tetroxide, whose oxygen doping amount is controlled to give a semi-transmissibility when the film is formed. It is particularly preferable that the film is a little blackish and has an energy absorption of 10 to 30% and a transmission of 40 to 60% for the light, and has a thickness of not more than 50 nm, preferably 30 to 50 nm.

When a layer 2' having both such functions of an interference layer and an absorption layer is provided at the energy-incoming side of a recording layer 1, as shown in FIG. 2(c), the thermal energy input to the recording layer 1 is increased and the recording sensitivity of an information recording-reproducing medium can be increased.

In the foregoing description, the layer having both functions of an interference layer and an absorption layer is in a single layer structure, but it is possible to provide a double layer structure of an absorption layer 3 and an interference layer 2, as shown in FIG. 2(d).

In the foregoing description, an absorption layer, or an interference layer, or a layer having both functions of the two layers is provided at the energy-incoming side of a recording layer 1 to increase the thermal energy input to the recording layer 1, thereby rapidly enhancing the temperature of the recording layer 1 to a higher one, but another means for enhancing the temperature of a recording layer is available. This can be attained by providing heat-insulating layers 5 to surround a recording layer 1, as shown in FIG. 3(a). Generally, the recording layer is so thin that it has a low mechanical strength as such, and thus the recording layer is often formed on a support layer 7 of metal sheet, glass sheet, plastic sheet or the like, as shown in FIG. 3(c). In such a structure, the thermal energy flows from the recording layer to the support layer, and the support layer 7 works as a cooler for the recording layer 1. That is, the temperature of the recording layer 1 is hard to enhance. To prevent the loss of the thermal energy, it is effective to provide a heat-insulating layer 5 between the recording layer 1 and the support layer 7, as shown in FIG. 3(b). Furthermore, the thermal energy flows from the recording layer to the energy-incoming side, and thus it is more effective to prevent the loss of the thermal energy in this direction.

When there is an interference layer on the upper side (energy-incoming side) of a recording layer, heat-insulating layers are provided to surround the interference layer and the recording layer. When there is an energy absorption layer on the upper side (energy-incoming side) of a recording layer, it is effective to also provide a heat-insulating layer 5 at the energy-incoming side of the energy absorption layer 3, as shown in FIG.

3(a), to prevent the loss of the thermal energy from the energy absorption layer.

The heat-insulating layer works as a shield from heat, and is preferably selected from SiO₂ glass, alumina and other oxides.

In the foregoing description, the support layer for the recording layer is provided at the opposite side to the energy-incoming side, but it is also possible to provide a support layer (substrate) at the energy-incoming side on the contrary.

In such a structure, a colorless, transparent film capable of transmitting the incoming energy, for example, glass sheet or plastic sheet, is used as a support layer. By providing the transparent layer 4 between the recording layer and the energy incoming side as shown in FIGS. 2(e) and (f), another effect can be obtained. That is, the information recording medium is exposed to the atmosphere, and thus dusts in the air often deposit thereon or finger prints of handling personnel often attach thereto. When the recorded data are reproduced in such a state, noises are increased to lower the S/N ratio. However, by providing a transparent layer 4 having a thickness of about 0.5 to about 2.0 mm on the upper side of a recording layer, as shown in FIG. 2(e), the dusts or the finger prints deposit on or adhere to the surface of the transparent layer 4 apart from the recording layer 1. An apparatus for reproducing the recorded data on the information recording-reproducing medium has an optical system similar to that of a microscope and observes a micro area on the recording layer to detect changes in the reflectance from one location to another on the recording layer 1 and reproduces the recorded data. When the recording layer 1 is in focus of the optical system, then the dusts or finger prints on the surface of the transparent layer 4 are outside the depth of a focus and thus form obscure images, giving no adverse effect on the reproduction signals without lowering the S/N ratio.

When there is a support layer on the energy-incoming side of a recording layer, as described above, a heat-insulating layer is provided at the lower side (opposite side to the energy-incoming side) of the recording layer to prevent the thermal loss to the air. By using a highly heat-insulating material as an interference layer or an absorption layer, the layer structure can be simplified.

Substrate

Glass, ceramics, and plastics such as polymethyl methacrylate, polystyrene, polycarbonate, etc. can be used as a substrate. A colorless, transparent substrate is preferable.

Protective layer

It is desirable to provide a protective layer 6 on the surface of a recording layer 1, as shown in FIG. 2(f) to protect the recording layer from damages due to contact with external appliances or prevent the recording layer from deposition of dusts. As a material for the protective layer, the same materials as those for the heat-insulating layer, such as SiO₂ glass, alumina, or other oxides can be used. The thickness is preferably a few tens of nn to 2 mm.

In the present information recording medium, recording, reproduction or erasing can be carried out by inputting an energy to the side on which the interference layer and the absorption layer are provided, and furthermore reproduction can be carried out from the side on which the interference layer and the absorption layer are provided, or on the side opposite thereto. In the reproduction from the side opposite to the side on which the interference layer and the absorption layer are provided, the substrate must be colorless and transparent, as described above, and when light is used for the reproduction, a protective layer having a high light transmissibility should be used.

Recording layer

It is preferable that the present recording layer is made from a metal or alloy having different crystal structure in a solid state at a first temperature (high temperature) higher than the room temperature and at a lower temperature (low temperature) than the first temperature, and a different crystal structure from the crystal structure in an equilibrium phase at room temperature, attained by quenching from the high temperature.

Such a metal or alloy has at least two spectral reflectances at one and same temperature by quenching from a solid phase state at a high temperature and can reversibly change the spectral reflectance. More specifically, such a metal or alloy has different phases of crystal structure in at least two temperature regions in a solid phase state, where the spectral reflectances are different in the quenched state of high temperature phase and in the unquenched standard, low temperature phase state, and the spectral reflectance is reversibly changible by heating and quenching in the temperature region of high temperature phase and by heating and cooling in the temperature region of low temperature phase. An alloy that can undergo reversible phase change between the amorphous state and the crystalline state is not included in such a metal or alloy as described above.

The principle of reversible changes in reflectance according to the present invention will be described, referring to FIG. 4. FIG. 4 is a phase diagram of X-Y binary alloy, where an $\alpha$ solid solution and $\beta$ and $\gamma$ intermetallic compounds exist. An alloy having a composition, for example, ABx, has a $\beta$ single phase, a $(\beta+\gamma)$ phase and a $(\alpha+\gamma)$ phase in a solid phase state. The crystal structures are different in the individual single phase states of $\alpha$, $\beta$ and $\gamma$ and also the optical properties, for example, spectral reflectance, are different in these single and mixed phases. Such an alloy has a $(\alpha+\gamma)$ phase at temperature $T_1$, which is generally room temperature, and is stable at this temperature. By heating the alloy from $T_1$ up to temperature $T_4$, followed by quenching from $T_4$ to $T_1$, the $\beta$ phase can be obtained at $T_1$. This phase state is different from the $(\alpha+\gamma)$ phase state, and thus a different spectral reflectance is obtained. By heating the quenched $\beta$ phase alloy to temperature $T_2$ below temperature Te from $T_1$, followed by cooling, the $\beta$ phase is transformed into the $(\alpha+\gamma)$ phase, and the spectral reflectance returns to the initial state. By repetitions of such two heating-cooling treatments, the spectral reflectance can be reversibly changed.

Examples of the alloy for the present recording layer include an alloy comprising silver as the main component and one of 30 to 46% by weight of zinc and 6 to 10% by weight of aluminum, an alloy comprising copper as the main component and at least one of 10 to 20% by weight of aluminum, 20 to 40% by weight of indium, and 16 to 35% by weight of tin, an alloy comprising gold as the main component and 2.5 to 5% by weight of aluminum, and these alloys further containing at least one of a small amount of elements of the groups VIII, Ib, IIb, IIIb, IVb, Vb, VIa and VIIa. Their content is preferably not more than 10% by weight.

To record information in a micro area of at least 20 megabits/cm² as a recording density, it is preferable that the recording layer has a thickness of 0.01 to 0.2 μm. A recording layer prepared in a desired shape by solidification directly from a gas phase or liquid phase by quenching is effective. To this effect, PVD process (vapor deposition, sputtering, etc.), CVD process, molten metal quenching process by pouring a molten metal onto the circumferential surface of a roll made from a highly heat conductive member and under high spead rotation, particularly a metallic roll, electroplating process, chemical plating process, etc. are applicable. When a powdery material is used, it is effective to apply the material to a substrate and bond it thereto. In the application, it is preferable to use a binder which undergoes no reaction even if the powder is heated.

To prevent the recording layer material from oxidation, etc. by heating, it is also effective to provide an antioxidative coating on the surface of the applied layer.

It is preferable to prepare the powder according to a gas atomizing process by atomizing a molten metal together with a gas or liquid refrigerant into water, thereby quenching the atomized molten metal. Fine powders having a particle size of not more than 0.1 mm, particularly not more than 1 μm are preferable.

The recording layer film can be formed by vapor deposition, sputtering, CVD, electroplating, chemical plating, etc., as described above. Particularly, in the formation of a film having a thickness of not more than 0.1 μm, sputtering is preferable, because the desired alloy composition can be readily controlled by the sputtering.

It is very effective to provide a damper layer for strains generated during the formation of the recording layer film between the substrate and the recording layer, because the recording layer can be made free from any strain. By bringing about a strain-free state, the phase transformation behavior of the recording layer can be normalized, and writing and erasing on a thinner film become possible. That is, the writing and erasing characteristics can be increased, and the unstability of the phase due to aging at room temperature can be eliminated thereby.

The recording layer film is usually formed by sputtering, and the recording layer is susceptible to a thermal stress due to a difference in the coefficient of thermal expansion from the substrate in the step of cooling to room temperature after sputtering the recording layer material. The recording layer is deformed by the thermal stress, generating strains. To eliminate the strains generated by the thermal stress in the recording layer, it is effective to provide between the substrate and the recording layer a layer having a coefficient of thermal expansion substantially equal to that of the recording layer or a smaller elastic constant than those of the recording layer and the substrate.

When the recording layer is made from an alloy, a suitable strain-damper layer material is a metal having physical properties equal to those of the alloy. However, when a metal is used as a strain-damper layer material, it should be noted that reaction may take place due to mutual diffusion with the alloy layer as the recording layer. If such reaction is highly possible to take place, it is preferable to provide between the strain-damper layer and the recording layer a very thin oxide layer to prevent the mutual diffusion and reaction while damping the strains in the recording layer.

As a strain-damping layer material, a high melting point metal incapable of reacting with the recording layer can be used. When an Ag alloy containing 37.5 to 40% by weight of Zn on the basis of total alloy is used as a recording layer material, it is very preferable to use Ag or an Ag alloy containing 30 to 35% by weight of Zn on the basis of total alloy as a strain-damper layer material.

When a substrate provided with information corresponding to track guide groove, track number, etc. in advance by groove processing is used, it is preferable to provide on a substrate a recording layer, an absorption layer comprising a polymer binder as a light absorber, and a protective layer for preventing vaporization and dissipation of the light absorber successively in this order, where it is necessary that the recording layer can change its crystal structure by the laser beam energy.

When the present invention is applied as a recording medium for the DRAW type optical disk, it is preferable to provide a reaction layer made from a material diffusible into the recording layer and solid-soluble therewith between the substrate and the recording layer. When an Ag-Zn alloy or Ag-Al alloy is used as a recording layer material, it is preferable that the reaction layer material is Au or Cu. By providing the reaction layer, the reaction layer material can be diffused into the recorded part in the recording layer when an high energy is input, and the phase in the recorded part can be stabilized thereby. More specifically, the temperature of a recording layer is enhanced by the input of a light energy, the phase in the room temperature state is transformed into another phase at a high temperature. At the same time, the atoms in a reaction layer diffuse into the recording layer and undergoes solid solution in the recorded part at the elevated temperature. The phase resulting from the quenching can be stabilized thereby.

Applications

In the present information recording medium, crystal structure of a recording layer changes by heating and quenching. It is also possible to locally change the crystal structure by local heating and quenching. By the change in the crystal structure, physical or electrical characteristics such as spectral reflectance of electromagnetic wave, electric resistivity, refractive index, polarizing ratio, transmissivity, etc. also change. By utilizing the changes in these characteristics, the present information recording medium can be used in devices for recording, display, sensor, etc.

As a means for recording information, etc., an electric energy in the form of voltage and current, and an electromagnetic wave (visible light, heat of radiation, ultraviolet ray, infrared ray, light of photographic flash lamp, electron beam, proton beam, laser beam of argon laser, semi-conductor laser, etc., heat, etc.) can be used.

It is preferable to utilize the present information recording medium in an optical disk by utilizing a change in the spectral reflectance by a reversible phase change. The optical disk includes a digital audiodisk (DAD or compact disk), a videodisk, a memory disk, etc., and the present invention is applicable to these types of optical disk.

The present information recording disk is applicable to any of ROM (read only memory) type, DRAW type and R/WM type disks, and is particularly very effective for the R/WM type disk.

Principle of recording and reproduction when the present invention is used as a recording medium for the optical disk will be given below, referering to one example.

At first, the recording medium is locally heated, and the crystal structure in the high temperature region is kept in the low temperature region by quenching after the heating to record desired information, or the high temperature phase may be locally heated as a base to record the information in the high temperature phase by local low temperature phases. By irradiating recorded part with light to detect a difference in the optical characteristics between the heated part and the unheated part, the recorded information can be reproduced. Furthermore, by heating the information-recorded part at a lower temperature or a higher temperature than the heating temperature for recording, the recorded information can be erased. The light is preferably a laser beam, particularly a laser of short wavelength.

In the recording and reproduction, the same laser source can be used, and in the erasing by irradiation, it is preferable to use other laser beam having a smaller energy density than that of the laser beam used for the recording.

The disk using the present information recording medium has such a remarkable merit that it is visibly determined whether information is recorded or not. Furthermore, recording or erasing can be carried out by a continued beam or pulse beam. In the erasing, it is possible to use a beam having a larger width than that of the beam used for recording the information.

The present information recording medium can partially change the spectral reflectance under the visible light and thus can record letters, figures, symbols, etc. without using a paint, and their displays can be visually discriminated. Furthermore, these pieces of information can be erased, and recording and erasing can be repeated. The recording can be also perpetually preserved.

The present information recording medium can be also utilized in a display device.

BRIEF DESCRIPTION OF THE DRAWINGS

FIG. 1 is a perspective, partially cutaway view of an information recording medium according to one embodiment of the present invention.

FIGS. 2 and 3 are schematic cross-sectional view showing the structure of information recording medium according to embodiments of the present invention.

FIG. 4 is equilibrium phase diagram of a binary alloy system used in the recording layer of the present invention.

FIGS. 5 to 10 are schematic cross-sectional views showing the structures of information recording media given in Examples of the present invention.

FIGS. 11 to 14 are diagrams showing spectral reflectance characteristics.

PREFERRED EMBODIMENTS OF THE INVENTION

Example 1

Figure 5A:
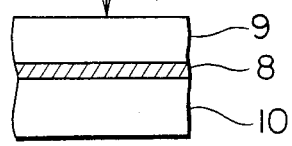

A 60 wt. % Ag - 40 wt. % Zn alloy was melted in a carbon boat in a $N_2$ gas atmosphere to prepare a target, about 100 mm in diameter and 10 mm in thickness, for vapor deposition by sputtering. A recording medium having a layer structure as shown in FIG. 5(a) was prepared with the thus prepared target in the following manner.

An alloy layer 8 of 60 wt. % Ag - 40 wt. % Zn was vapor deposited by sputtering to a thickness of about 100 nm on a glass substrate 10, 25 mm in diameter and 1.2 mm in thickness under conditions of sputtering output: 140 to 200 W and substrate heating temperature: 200° C. After vacuum evacuation of the container to about $10^{-7}$ Torr, an Ar gas was introduced therein under 5–30 m Torr. DC magnetron sputtering was used in the sputtering.

$Ta_2O_5$ was further vapor deposited to a thickness of about 500 nm as an interference layer 9 for laser beam on the alloy layer. The $Ta_2O_5$ vapor deposition by sputtering was carried out by RF sputtering under the introduction of about 5% $O_2$.

The surface of the thus prepared recording medium, 25 mm in diameter, was silver white. Then, the recording medium was heated in an electric furnace to about 350° C., and then quenched in water. It was found that the alloy layer was changed from silver white to pink. This was due to the phase change of the 60 wt. % Ag - 40 wt. % Zn alloy from the $\beta$ phase to the $\beta'$ phase by quenching. Furthermore, the quenched recording medium was heated in the electric furnace to about 200° C., and then slowly cooled in the air, whereby the pink color was changed to the original silver white.

Same color change due to the phase change occurred by a laser beam. For example, in the case of recording by irradiating the recording medium with an Ar laser with a power of 10 to 50 mW and a beam diameter of 1 to 5 $\mu$m, the recorded part changes from silver white to pink. When the recorded part was further irradiated with a laser beam of a lower power density difocussed with a power of 50 to 100 mW, the pink color was returned to the original silver white and erased.

Thus, the characteristics of recording and erasing on the recording medium can be carried out with a laser beam or more simply by heat treatment as described above.

In FIGS. 11(a) and (b), spectral reflectance characteristics of the recording medium prepared by the said heat treatment are shown, where FIG. 11(b) shows the spectral reflectance characteristics of a layer structure including an interference layer 9 ($Ta_2O_5$, 500 mm in thickness) as shown in FIG. 5(a), and it is seen that a remarkable interference took place. FIG. 11(a) shows the spectral reflectance characteristics of a layer structure of only the 60 wt. % Ag - 40 wt. % Zn alloy 8 vapor deposited by sputtering on the glass substrate 10 and it is seen that the reflectance was high on both the recorded and unrecorded parts.

In FIG. 11(b) utilizing the bottoms of interference, it is seen that the reflectance was considerably lowered at the respective wavelengths of Ar laser ($\lambda_{Ar}$ =488 nm) and semi-conductor laser ($\lambda_L$=830 nm). That is, the input energy of laser beam was efficiently absorbed in the recording medium, as compared with that of the recording medium without any interference layer as shown in FIG. 11(a). This means that the recording and erasing can be performed with less power. In the foregoing embodiment, the interference layer 9 was made from $Ta_2O_5$ of high refractive index and its thickness was 500 nm.

Figure 5B:
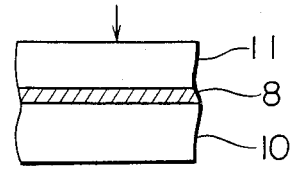
Figure 5C:
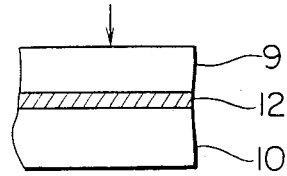
Figure 5D:
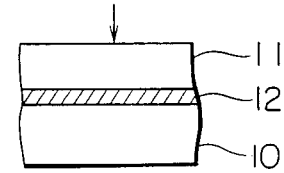

Other embodiments likewise utilizing such a light interference as above are shown in FIGS. 5(b) to (d). It is desirable that the interference layer 9 has a high refractive index and a transmissibility. FIG. 5(b) shows an embodiment using $Al_2O_3$ as an interference layer 11, where the reflectance can be lowered likewise by adjusting the layer thickness to the interference condition.

Figure 12A:
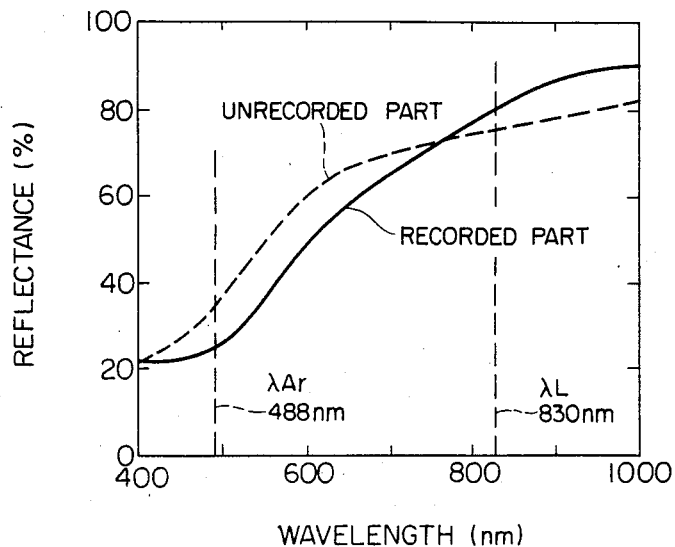
Figure 12B:
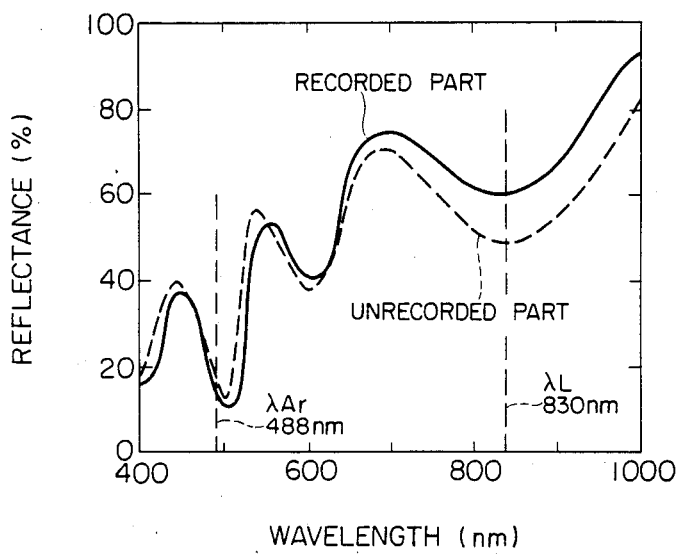

FIGS. 5(c) and (d) show embodiments of replacing the recording layer of alloy with a recording layer 12 of 82 wt. % Cu - 14 wt. % Al - 4 wt. % Ni, and FIG. 12(a) shows the spectral reflectance characteirstics of a structure without the interference layer 9 and FIG. 12(b) shows that with an interference layer ($Ta_2O_5$, thickness 500 nm) in FIG. 5(c). It is seen that the reflectance is remarkably lowered at the respective wavelengths of Ar laser and semi-conductor laser as in the case of the reflectance of 60 wt. % Ag - 40 wt. % Zn alloy layer shown in FIG. 11. It was found that digital and analog recording and reproduction could be made with a width of not more than 1 $\mu$m by the semi-conductor laser.

Example 2

Figure 6A:
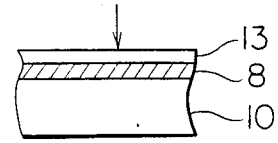

In the same manner as in Example 1, a 60 wt. % Ag - 40 wt. % Zn alloy layer 8 (layer thickness 100 nm) was vapor deposited by sputtering on a glass substrate 10 in FIG. 6(a), and a CrOx (chromium oxide) layer 13 was further vapor deposited in vacuum thereon to a thickness of 5 to 10 nm. The CrOx layer was deposited as an energy absorption layer on the information recording alloy layer of high reflectance. In the alloy layer undergoing the phase change in the crystal structure, the layer itself has a high reflectance, and thus the input thermal efficiency of laser beam is poor. To cover this disadvantage, the CrOx layer 13 was provided on the recording layer.

Figure 13:
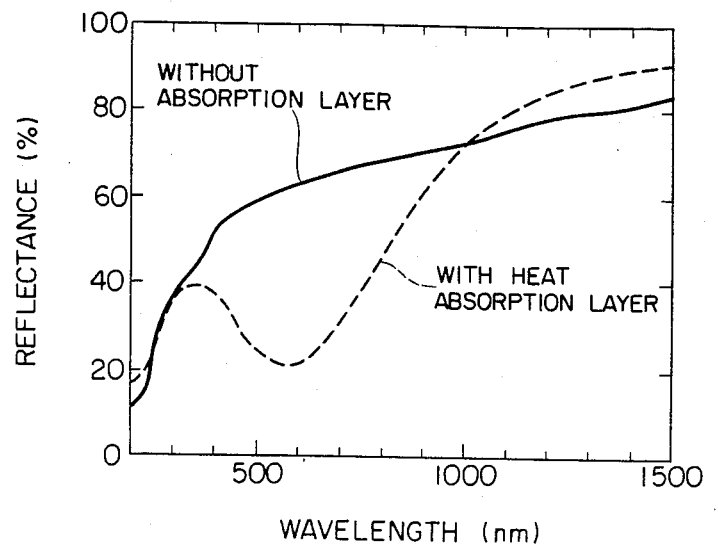

FIG. 13 shows the spectral reflectance characteristics of the layer structure with the energy absorption layer and that without any energy absorption layer. As is obvious from FIG. 13, the reflectance is lowered in the layer structure with the energy absorption layer in the wavelength range of about 300 to about 1,000 nm.

Figure 6B:
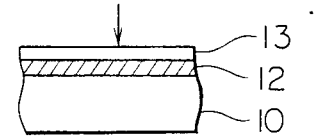
Figure 6C:
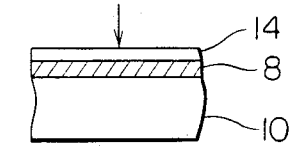
Figure 6D:
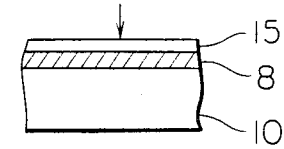

FIG. 6(b) shows the layer structure with a recording layer 12 of 28 wt. % Cu - 14 wt. % Al - 4 wt. % Ni and the same CrOx layer 13, where it was found that the reflectance was effectively lowered likewise. FIGS. 6(c) and (d) show the layer structures of using an energy absorption layer 14 of $Cu_2O$ and that 15 of $Fe_3O_4$, respectively, in place of the energy absorption layer 13 in FIG. 6(a), where it was found that the reflectance was effectively lowered likewise.

Example 3

Figure 14:
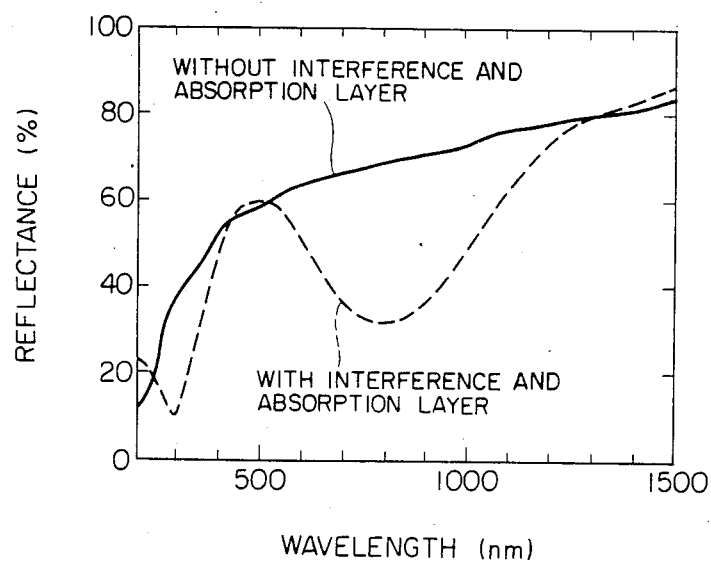

In the same manner as in Example 1, an alloy film 8 of 60 wt. % Ag - 40 wt. % Zn was vapor deposited by sputtering on a glass substrate 10 to a thickness of about 100 nm in FIG. 7, and a CrOx layer 13 was further vapor deposited in vacuum thereon to a thickness of 10 to 20 nm. The CrOx layer not only provided the characteristics of energy absorption layer shown in FIG. 13, but also increased the thickness, thereby lowering the reflectance by the interference at the same time. The CrOx layer had a transmissibility and also a high refractive index, and thus a remarkable interference effect was obtained with a small thickness. FIG. 14 shows the spectral reflectance characteristics of the said layer structure aimed at both effects of energy absorption and interference and that of only recording layer 8. As is obvious from FIG. 14, the reflectance is considerably lowered by the interference effect in the wavelength range of 500 to 1,000 nm, and at the same time the absorption effect can be attained, resulting in the decrease of overall reflectance. Thus, CrOx is suitable for decreasing the reflectance and increasing the input energy efficiency of laser beam as $Ta_2O_5$. Thus, the layer structure as shown in FIG. 7 is quite practical.

Example 4

In the same manner as in Example 1, an alloy layer 8 of 60 wt. % Ag - 40 wt. % Zn was vapor deposited by sputtering on a glass substrate 10 to a thickness of about 100 nm in FIG. 8, a CrOx layer 13 was further vapor deposited in vacuum thereon to a thickness of about 5 nm, and a $SiO_2$ layer 20 was further vapor deposited by high speed sputtering thereon to a thickness of 50 $\mu$m.

In this embodiment, the CrOx layer corresponded to an energy absorption layer as in Example 2, and the thick $SiO_2$ layer 20 acted as a transparent protective layer, which had not only a protective effect on the recording medium, but also an effect of preventing the decrease in the S/N ratio due to the dusts, dirts, etc. of less than some size during the reproduction, because a laser beam having some diameter was rapidly contracted on the recording layer.

In another structure of the transparent protective layer, another glass substrate 10 was provided on the interference layer 9 on the recording layer 8 by bonding, as shown in FIG. 8(b), where the glass substrate 10 (thickness 1.2 mm) itself could attain the effect of preventing the decrease in S/N ratio as a transparent protective layer.

Example 5

In the same manner as in Example 1, an alloy layer 8 of 60 wt. % Ag - 40 wt. % Zn was vapor deposited by sputtering on a glass substrate 10 to a thickness of about 100 nm in FIG. 9(a), a CrOx energy absorption layer 13 was further vapor deposited in vacuum thereon to a thickness of 5 nm, and then a $Ta_2O_5$ interference layer 9 was further vapor deposited by sputtering thereon to a thickness of about 500 nm. In the thus prepared layer structure, the interference effect was borne by $Ta_2O_5$ and the energy absorption effect by CrOx, whereby the input energy of laser beam could be efficiently transferred to the recording layer 8. FIG. 9(b) shows another layer structure comprising an energy absorption layer 14 of $Cu_2O$ and an interference layer 11 of $Al_2O_3$, where the energy absorption and the interference effect were borne by the layers 14 and 11, respectively, and the input energy efficiency of a laser beam could be increased thereby.

Example 6

In the same manner as in Example 1, a $SiO_2$ layer 20 was vapor deposited by sputtering on a PMMA substrate 17 to a thickness of about 100 nm in FIG. 10, an alloy layer 8 of 60 wt. % Ag - 40 wt. % Zn was provided thereon to a thickness of about 100 nm, a CrOx energy absorption layer 13 was further provided thereon to a thickness of about 5 nm, and a $SiO_2$ layer 20 was further provided thereon to a thickness of about 100 nm. That is, a layer structure comprising the recording layer and the energy absorption layer provided between the $SiO_2$ layers 20 having a high heat-insulating effect was provided. The $SiO_2$ layers 20 prevented dissipation of the heat generated in the energy absorption layer and the recording layer to narrow the input heat distribution contributing to the phase change and improve the input energy efficiency.

Example 7

In FIG. 1, a perspective, partially cutaway view of the structure according to one embodiment of the present information recording medium is shown. This medium was prepared in the same manner as disclosed in the foregoing Examples. Tracking grooves 19 were provided on a silica glass substrate 7 by etching or by other means, and an alloy layer 1 of 65 wt. % Ag - 35 wt. % Zn was provided as a recording layer thereon to a thickness of about 100 nm in the same manner as in Example 1, an interference layer 2 of $Ta_2O_5$ was further provided thereon to a thickness of about 500 nm, and a transparent PMMA layer 4 was further provided thereon.

In this embodiment, a light energy of laser beam 18 focussed by a lens 20 could be effectively given to the recording layer 1 by the interference layer 2, and thus recording, reproduction and erasing of information could be carried out with less energy.

Example 8

Figure 15:
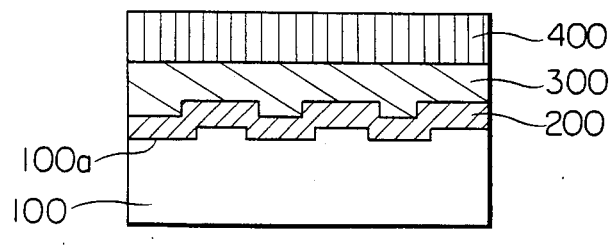
FIG. 15 is a schematic cross-sectional view of an information recording medium according to other embodiment of the present invention.

In FIG. 15, other embodiment of the present invention is shown, where numeral 100 is a substrate, on one of which sides are provided track guide grooves 100a, numeral 200 is a recording layer made from a metal film provided on the substrate 100, numeral 300 is a light absorption layer containing a polymer binder, provided on the recording layer 200, and numeral 400 is a protective layer for preventing vaporization or dissipation of the polymer binder in the light absorption layer 300.

More specifically, a disk of this four-layer structure was prepared by vapor depositing an alloy layer 200 of 65 wt. % Ag - 35 wt. % Zn by sputtering as a metal film to a thickness of 500 nm on an acryl resin substrate 100 provided with track guide grooves 100a having a depth of 100 nm on the surface, further applying thereto a solution of a metal complex salt and nitrocellulose as a binder in a ratio of 1:1 by weight in a ketone-based solvent as a light absorber by spin coating at 2,000 rpm, followed by drying, thereby forming a light absorption layer 300 to a thickness of 200 nm, and then vapor depositing a $SiO_2$ film 400 by sputtering thereon to a thickness of at least 100 nm.

Figure 16:
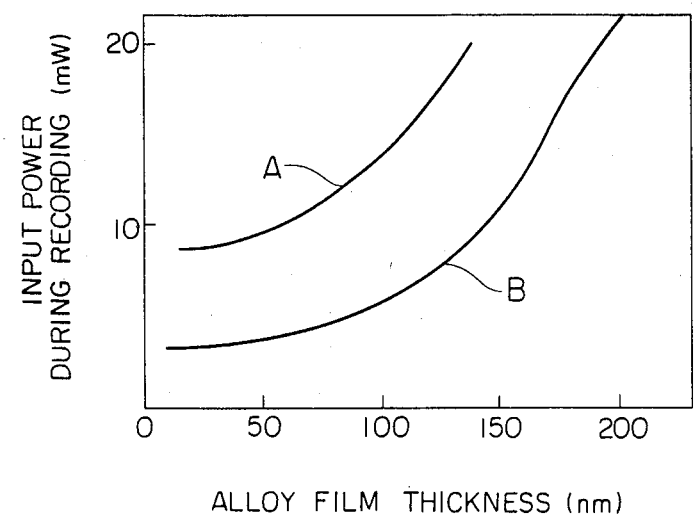
FIG. 16 is a characteristic diagram showing changes in the recording sensitivity of a recording layer with respect to the thickness of the recording layer.

The alloy layer of 65 wt. % Ag - 35 wt. % Zn as a metal film 2 working as a light recording medium could change the reflectance by a change in the crystal structure. As shown in FIG. 16, there were changes in the light source power required for recording (semi-conductor laser: $\lambda = 830$ nm) with respect to the alloy film thickness.

Principle of recording on the alloy film of 65 wt. % Ag - 35 wt. % Zn as a light recording medium will be described below.

The alloy film of 65 wt. % Ag - 35 wt. % Zn shows a crystal structure of $\beta$ phase when heated to 320° C. or higher and quenched, but the $\beta$ phase turns a $\zeta$ phase by reheating the $\beta$ phase to a temperature range of 180° to 319° C. Since the reflectance changes by the differences in the crystal structure, such a characteristic can be utilized as a light recording medium at any desired light wavelength. However, the light recording medium of 65 wt. % Ag - 35 wt. % Zn, as formed only in the single phase on the substrate, has a poor heating effect by the light source power as shown by curve A in FIG. 16, and consequently the recording time and the erasing time are retarded. This seems due to the low light absorption effect of the alloy film of 65 wt. % Ag - 35 wt. % Zn as a recording medium film. To increase the characteristic of light recording medium, it is necessary to form a light absorber in a polymer film layer having a high light absorption effect. Curve B in FIG. 16 shows relationship between the input power during the recording and the alloy film thickness when a light absorber is provided on the alloy film of 65 wt. % Ag - 35 wt. % Zn. It is seen from FIG. 16 that the recording efficiency can be remarkably increased by providing the light absorber. However, when the thickness of the alloy film of 65 wt. % Ag - 35 wt. % Zn exceeds 200 nm, the light cannot be transmitted therethrough, and thus the present information recording medium cannot have the effect of the light absorption film. When the thickness of the alloy film of 65 wt. % Ag - 35 wt. % Zn is less than 10 nm on the other hand, it is not only hard to form a recording medium film without any defect, but also the characteristics of the information recording medium, for example, reflectance, are lowered. Thus, it is desirable that the thickness of the alloy film of 65 wt. % Ag - 35 wt. % Zn to be used as an information recording medium is in a range of 10 to 200 nm. On the other hand, it is desirable that the thickness of a light absorber 300 in a polymer layer to be formed to increase the characteristics of the information recording medium is in a range of 40 to 300 nm in view of an influence of the heat diffusion at the erasing of the recording. That is, the light absorbed in the light absorber 300 is converted to an energy, but when the thickness of light absorber 300 is less than 40 nm, the energy conversion efficiency of the absorbed light is low, whereas, when the thickness exceeds 300 nm, no suitable energy state for the erasing of the recording cannot be obtained due to the heat diffusion.

The protective layer 400 provided to protect the light absorber 300 in a polymer layer is to prevent the loss of the polymer layer by vaporization and dissipation when the polymer layer is irradiated with light. That is, the light absorber in the polymer layer is brought into a higher energy level by light absorption, but it has been found that the loss of the light absorber can be prevented by providing a dense material such as $SiO_2$, various heat-resistant resins, or ceramics to cover the light absorber. That is, the protective layer 400 is provided to prevent the loss of polymer binder by vaporization and dissipation, and thus the protective layer must have a suitable thickness for preventing vaporization. In the case of using $SiO_2$ as a protective layer, it is desirable that the thickness is at least 20 nm.

Recording was carried out with the disk thus prepared under an input power of 8 mW on the medium, and it was found that the recording layer had a good S/N ratio.

The present invention provides a layer structure with a high energy utilization efficiency as an optical disk recording medium particularly utilizing a difference in the spectral reflectance due to a phase change between the crystal structures.

What is claimed is:

1. An information recording medium which comprises a recording layer for recording information by heating through an incoming energy, the recording layer being made from a metal or an alloy capable of forming a different crystal structure from the equilibrium phase at room temperature by quenching from a solid state at a high temperature, and at least one of an interference layer and an absorption layer for the incoming energy, provided at the energy-incoming side of the recording layer; the interference layer being made from a member selected from the group consisting of tantalum oxide, chromium oxide, titanium oxide, silicon oxide and aluminum oxide, and the absorption layer being made from a member selected from the group consisting of chromium oxide, copper oxide and tri-iron tetroxide.

2. An information recording medium according to claim 1, wherein the absorption layer is provided on the recording layer and the interference layer is provided on the absorption layer.

3. An information recording medium according to claim 1, wherein at least one of the interference layer and the absorption layer serves as a support for the recording layer.

4. An information recording medium, which comprises a substrate, a recording layer for recording information by heating through incoming energy provided on the substrate, the recording layer being made from a metal or an alloy capable of forming a different crystal structure from the equilibrium phase at room temperature by quenching from a solid state at a high temperature, and at least one of an interference layer and an absorption layer for the incoming energy provided at the energy-incoming side of the recording layer; the interference layer being made from a member selected from the group consisting of tantalum oxide, chromium oxide, titanium oxide, silicon oxide and aluminum oxide, and the absorption layer being made from a member selected from the group consisting of chromium oxide, copper oxide and tri-iron tetroxide.

5. An information recording medium according to claim 4, wherein the substrate is a disk or a tape.

6. An information recording medium according to claim 5, wherein the substrate is provided with tracking grooves.

7. An information recording medium according to claim 4, wherein both of the absorption layer and the interference layer are provided on the recording layer.

8. An information recording medium, which comprises a recording layer for recording information by heating through incoming energy, the recording layer being made from a metal or an alloy capable of forming a different crystal structure from the equilibrium phase at room temperature by quenching from a solid state at a high temperature, at least one of an interference layer and an absorption layer for the incoming energy provided at the energy-incoming side of the recording layer, and a heat-insulating layer provided at least at one side of the energy-incoming side of the interference layer and the absorption layer and the opposite side to the energy-incoming side of the recording layer; the heat-insulating layer being made from at least one of silicon oxide and aluminum oxide; the interference layer being made from a member selected from the group consisting of tantalum oxide, chromium oxide, titanium oxide, silicon oxide and aluminum oxide, and the absorption layer being made from a member selected from the group consisting of chromium oxide, copper oxide and tri-iron tetroxide.

9. An information recording medium according to claim 8, wherein the absorption layer, the interference layer and the heat-insulating layer are provided successively in this order at the energy-incoming side of the recording layer.

10. An information recording medium, which comprises a substrate, a recording medium for recording information by heating through incoming energy provided on the substrate, the recording layer being made from a metal or an alloy capable of forming a different crystal structure from the equilibrium phase at room temperature by quenching from a solid state at a high temperature, at least one of an interference layer and an absorption layer for the incoming energy provided at the energy-incoming side of the recording layer, and a heat-insulating layer provided between the substrate and the recording layer; the heat-insulating layer being made from at least one of silicon oxide and aluminum oxide; the interference layer being made from a member selected from the group consisting of tantalum oxide, chromium oxide, titanium oxide, silicon oxide and aluminum oxide, and the absorption layer being made from a member selected from the group consisting of chromium oxide, copper oxide and tri-iron tetroxide.

11. An information recording medium, which comprises a recording layer for recording information by heating through incoming energy, the recording layer being made from a metal or an alloy capable of forming a different crystal structure from the equilibrium phase at room temperature by quenching from a solid state at a high temperature, at least one of an interference layer and an absorption layer for the incoming energy provided on the energy-incoming side of the recording layer; the interference layer being made from a member selected from the group consisting of tantalum oxide, chromium oxide, titanium oxide, silicon oxide and aluminum oxide, and the absorption layer being made from a member selected from the group consisting of chromium oxide, copper oxide and tri-iron tetroxide, a colorless, transparent layer for transmitting the incoming energy, provided thereon.

12. An information recording medium according to claim 11, wherein the colorless, transparent layer is made from a glass sheet or a plastic sheet.

13. An information recording medium, which comprises a recording layer for recording information by heating through incoming energy, the recording layer being made from a metal or an alloy capable of forming a different crystal structure from the eqilibrium phase at room temperature by quenching from a solid state at a high temperature, at least one of an interference layer and an absorption layer for the incoming energy provided on the energy-incoming side of the recording layer; the interference layer being made from a member selected from the group consisting of tantalum oxide, chromium oxide, titanium oxide, silicon oxide and aluminum oxide, and the absorption layer being made from a member selected from the group consisting of chromium oxide, copper oxide and tri-iron tetroxide, a colorless, transparent layer for transmitting the incoming energy provided thereon, and a heat-insulating layer provided on the opposite side to the energy-incoming side of the recording layer, the heat-insulating layer being made from at least one of silicon oxide and aluminum oxide.

14. An information recording medium, which comprises a substrate, a recording layer for recording information by heating through incoming energy provided on the substrate, the recording layer being made from a metal or an alloy capable of forming a different crystal structure from the equilibrium phase at room temperature by quenching from a solid state at a high temperature, at least one of an interference layer and an absorption layer for the incoming energy provided on the energy-incoming side of the recording layer, and aluminum oxide; the interference layer being made from a member selected from the group consisting of tantalum oxide, chromium oxide, titanium oxide, silicon oxide and aluminum oxide, and the absorption layer being made from a member selected from the group consisting of chromium oxide, copper oxide and tri-iron tetroxide, and a strain damper layer provided between the recording layer and the substrate.

15. An information recording medium for a DRAW type optical disk, which comprises a substrate, a recording layer for recording information by heating through incoming energy, the recording layer being made from a metal or an alloy capable of forming a different crystal structure from the equilibrium phase at room temperature by quenching from a solid state at a high temperature, at least one of an interference layer and an absorption layer for the incoming energy provided on the energy-incoming side of the recording layer, and a reaction layer made from gold or copper, provided between the substrate and the recording layer; the interference layer being made from a member selected from the group consisting of tantalum oxide, chromium oxide, titanium oxide, silicon oxide and aluminum oxide, and the absorption layer being made from a member selected from the group consisting of chromium oxide, copper oxide and tri-iron tetroxide.

16. An information recording medium for a DRAW type optical disk according to claim 15, wherein the alloy is a silver alloy containing 30 to 46% by weight of zinc on the basis of total alloy or a silver alloy containing 6 to 10% by weight of aluminum on the basis of total alloy.

17. An information recording medium, which comprises a recording layer made from a metal or an alloy forming a different crystal structure from the equilibrium phase at room temperature by quenching from a solid state at a high temperature, at least one of an interference layer and an absorption layer for the incoming energy provided on the energy-incoming side of the recording layer and a protective layer having a light transmissibility and acting as a shield against the atmosphere provided at least on the recorded information-reproducing side of the recording layer; the interference layer being made from a member selected from the group consisting of tantalum oxide, chromium oxide, titanium oxide, silicon oxide and aluminum oxide, and the absorption layer being made from a member selected from the group consisting of chromium oxide, copper oxide and tri-iron tetroxide.

18. An information recording medium according to claim 17, wherein the recording layer is a film and is provided on a substrate in a disk or tape form.

* * * * *